3,597,180
INSULATING LAYER FOR BUSHING SUPPORTING SYSTEM

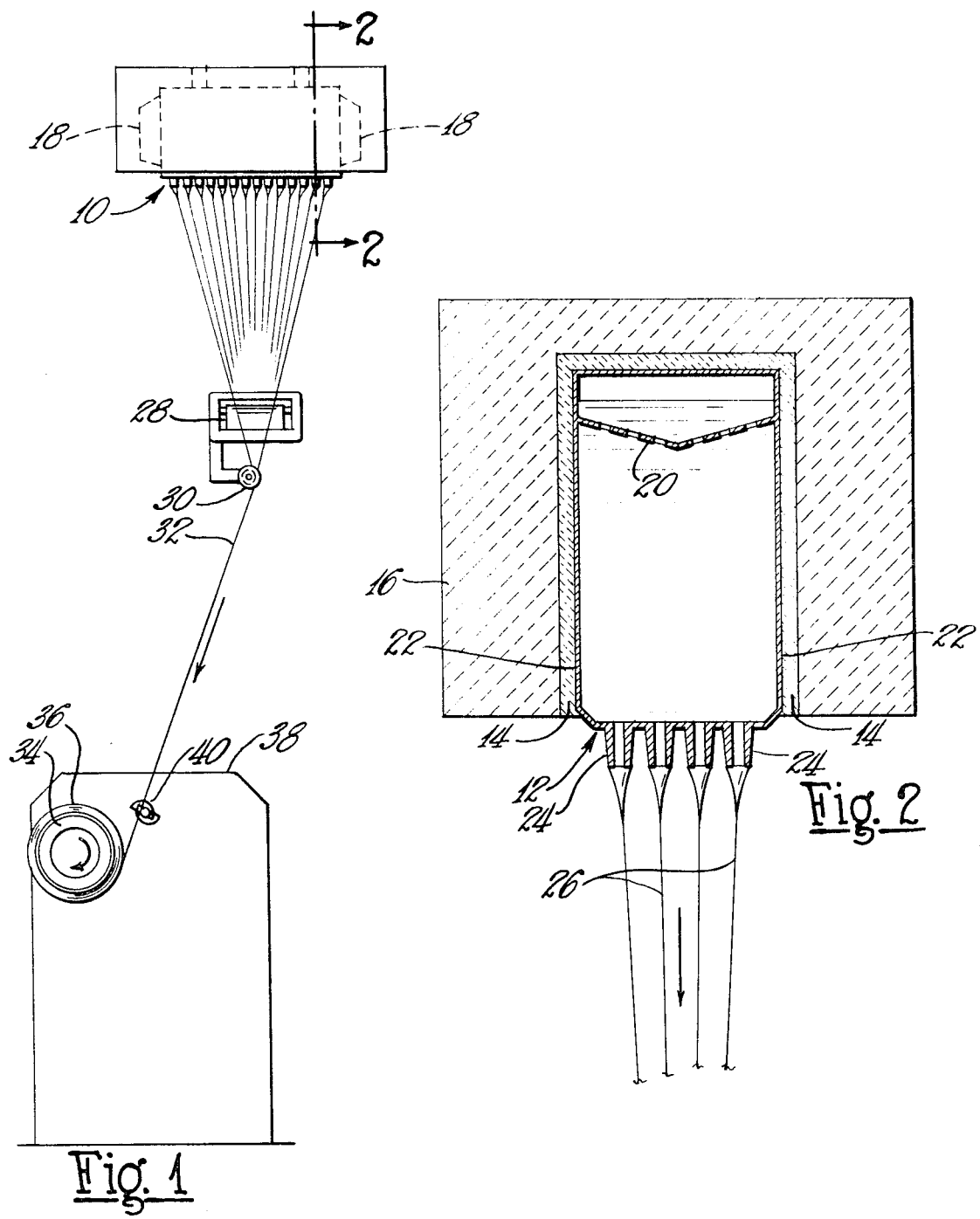

Thomas D. Erickson, Newark, Ohio, assignor to Owens-Corning Fiberglas Corporation
Filed Aug. 14, 1968, Ser. No. 752,601
Int. Cl. C03b 37/00, 29/00
U.S. Cl. 65—33                                4 Claims

ABSTRACT OF THE DISCLOSURE

A platinum bushing from which glass fibers are attenuated is supported by a cast ceramic body with an insulating layer therebetween. The insulating layer consists essentially of highly refractory fibers of silica and alumina to which additional alumina is supplied so that when the bushing is heated to an elevated temperature, in excess of 2800° F., the fibrous insulating layer transforms to mullite and is free of any glass. Such an insulating layer has a much longer life than those heretofore employed and does not react with the cast ceramic supporting body as has heretofore occurred.

---

This invention relates to a bushing supporting system and particularly to an insulating layer of highly refractory fibers located between the bushing and a ceramic supporting body.

Platinum bushings are well known in the art for containing and melting glass which is attenuated into glass filaments through small tips in the bottom of the bushing. Particularly when such bushings are operated at higher temperatures, e.g. above 2800° F., the bushings are supported in a highly refractory cast ceramic body with an insulating layer employed between the bushing and the body. Heretofore, such layers have been relatively short-lived, with glass being formed in the layer which drops out and also tends to react with the cast ceramic material of the supporting body. Consequently, voids result in the insulating layer, and the adjacent wall portion of the platinum bushing correspondingly loses its support, causing the platinum wall of the bushing to bow out at that portion and result in a weakness in the bushing which can eventually cause failure.

The present invention is based on the discovery of an improved insulating material for use with a bushing and a ceramic supporting body. The new insulating layer does not form glass which can separate from the layer and does not have a tendency to react with the ceramic supporting body. Consequently, the new insulating layer has a life many times that of the layers heretofore employed.

In accordance with the invention, refractory insulating material consisting essentially of fibers of alumina and silica are provided. Additional alumina is supplied to the composition with the result that when the combined material is employed in the insulating layer at an elevated temperature, the fibers gradually transform mostly into mullite fibers which do not react with the ceramic material and have a long life. In a specific form, the alumina-silica fibers employed are commercially available and are about one-half alumina and about one-half silica, by weight. To these fibers is added twenty-to-forty percent alumina, by weight, by making a slurry of the alumina and immersing the fibrous material in the slurry. When the resulting material is employed as an insulating layer with a bushing and a ceramic supporting body, and with the bushing operating at 2800° F. or higher, the alumina-silica fibers gradually transform into crystalline mullite fibers over a period of time. The resulting material has an appearance and physical properties similar to the alumina-silica fibers, although some corundum may also be present. In any event, the material is free of glass which other which is formed in the unmodified alumina-silica fibers when operated under the same conditions for a period of time.

It is, therefore, a principal object of the invention to provide an improved insulating layer for use with a platinum bushing and a cast ceramic supporting body.

Another object of the invention is to provide an improved method for making a highly refractory insulating layer.

Other objects and advantages of the invention will be apparent from the following detailed description of a preferred embodiment thereof, reference being made to the accompanying drawing in which:

FIG. 1 is a somewhat schematic view in elevation of apparatus for forming glass filaments, and winding them onto a package; and FIG. 2 is a somewhat schematic view in vertical cross section of a fiber forming bushing, taken along the line 2—2 of FIG. 1.

Referring to the drawings, the apparatus shown includes a bushing assembly 10 comprising a platinum bushing 12, an insulating layer 14, and a cast ceramic or cement supporting body or block 16 around the bushing. The bushing 12 is of a known design and includes electrical terminals or ears 18 at the ends thereof to which power is supplied to heat glass in the bushing to an elevated temperature, primarily through a grid 20 extending longitudinally of the bushing and between sidewalls 22 thereof which are also of platinum. In this instance, molten glass is supplied to the bushing 12 from a separate melting device (not shown) located thereabove with the bushing 12 then serving to maintain the molten glass therein at a controlled temperature. However, the invention can be equally applied to a bushing of the type in which glass in solid form is supplied thereto and melted within the bushing. The molten glass in the bushing 12 flows through bushing tips 24 where it is attenuated into filaments 26 to which a size or binder is applied by an applicator 28 with the filaments 26 then gathered by a gathering shoe 30 into a strand 32. The strand 32 is wound on a collet 34 to form a package 36 of the strand with the collet 34 being driven by means of a supporting and drive unit 38 which also supplies the force for attenuating the glass into the filaments. A level wind unit 40 distributes the strand 32 uniformly on the package 36.

The insulating layer 14 between the platinum walls 22 of the bushing 12 and the cast ceramic body 16 tends to have a relatively short life, particularly when the bushing 12 is operated at temperatures in the order of 2800° F. or higher. Heretofore, the insulating layer 14 has been of commercially available alumina-silica fibers in which voids or cavities appear after a period of time in operation at the elevated temperatures. In the areas where the voids occur in the layer 14, the platinum walls 22 lose their support and tend to bulge outwardly, eventually failing. The voids in the layer 14 are thought to be caused by a glass formed in the layer which reacts with the cast ceramic body 16 or because the glass becomes sufficiently fluid to drain downwardly in the layer 14 and leave the voids.

In accordance with the invention, it has been discovered that alumina can be added to the insulating layer to overcome the above problem and substantially increase the life of the bushing assembly. The additional alumina in the alumina-silica fiber mass is apparently absorbed into the fibers at elevated temperatures over a period of time, with the fibers then transforming into mullite, although some corundum may be present also. The product, after being subjected to an elevated temperature in the order of 2800° F. or higher for a period of about sixteen hours or longer has the same appearance as the original alumina-silica fiber product and will have substantially similar physical characteristics. However, when the alumina-silica fibers are used alone in the insulating layer, the layer will contain about twenty to thirty percent glass after a relatively short period of operation at elevated temperatures. This glass, as discussed previously, causes voids, with the platinum wall 22 adjacent the voids then no longer being supported and eventually bulging and failing. The addition of the alumina eliminates all glass in the insulating layer, leaving primarily mullite crystals with up to about thirty percent corundum.

In a particular example, highly refractory fibrous material, commercially available under the trademark Fiberfrax, for example, was used as the insulating layer. This material is also compressible and permeable with the fibers being intertwined and varying in length. These fibers consist essentially of fifty-two percent silica and forty-eight percent alumina in an amorphous state. This material, when used alone and heated to 2800° F. for sixty hours, was found to contain from twenty to thirty percent glass. In accordance with the invention, alumina was added to this fibrous material and greatly increased the life thereof. Powdered alumina or Alundum cement, which is ninety-eight to ninety-nine percent pure alumina, was added to the fibrous material in an amount from twenty to forty percent alumina, by weight. This was accomplished by mixing the alumina with water sufficient to make a thick slurry having approximately the consistency of whipped cream. The fibrous mass of alumina-silica fibers was then immersed in the slurry. After thorough immersion, the modified insulating layer was placed against the outer platinum walls 22 of the bushing 12 and the castable ceramic or cement forming the body 16 was then cast around the combination. An analysis of the layer after being employed with a bushing operated at 2800° F. for sixteen hours showed the layer to be entirely free of glass and containing eighty percent mullite crystals and twenty percent corundum. Depending upon the particular alumina-silica fibers employed and upon the amount of alumina added, the resulting layer will contain from about sixty to one hundred percent needle-like mullite crystals appearing similar to the original alumina-silica fibers and from about forty to zero percent corundum. The corundum does not have any substantial effect on the physical properties and life of the layer. The important point is that the layer is free of glass.

Various modifications of the above described embodiment of the invention will be apparent to those skilled in the art, and it is to be understood that such modifications can be made without departing from the scope of the invention, if they are within the spirit and the tenor of the accompanying claims.

I claim:
1. The method of producing a combination of a bushing, an insulating layer, and a ceramic supporting body, said method comprising forming on side walls of the bushing a compressible, permeable layer of a fibrous material, the fibers being about one-half alumina and about one-half silica in an amorphous state and capable of being converted from the amorphous state to a crystalline state at a temperature in the order of at least 2800° F., the layer having powdered alumina therein in an amount from twenty percent to forty percent, by weight, surrounding the bushing and the layer of the combined fibrous material and alumina with a castable cement, and heating the bushing to a temperature of at least 2800° F. for at least sixteen hours to enable the alumina of the layer to react in situ with the fibers thereof to crystallize and form mullite, with the resulting layer being substantially free of glass.

2. The method according to claim 1 characterized by combining the alumina and the fibrous material by mixing the powdered alumina with water in a quantity to produce a thick slurry, and combining the slurry with the fibrous material, prior to forming the layer on the side walls of the bushing.

3. The method according to claim 2 characterized by immersing the fibrous material in the slurry of alumina.

4. The method according to claim 1 characterized further by the final resulting layer having corundum present in an amount up to about forty percent, by weight.

References Cited

UNITED STATES PATENTS

| | | | |
|---|---|---|---|
| 2,141,930 | 12/1938 | Partridge | 65—374 |
| 2,535,888 | 12/1950 | Billman | 65—12X |
| 2,777,254 | 1/1957 | Siefert et al. | 65—374X |
| 2,947,114 | 8/1960 | Hill | 65—374X |
| 3,113,878 | 12/1963 | Martin | 65—43X |
| 3,220,915 | 11/1965 | Shannon | 65—33X |
| 3,269,818 | 8/1966 | Tiede | 65—33X |
| 3,282,711 | 11/1966 | Lin | 65—33X |

OTHER REFERENCES

Mullite Fused and Cast Glass Industry, November 1926, vol. 7, pp. 257–261.

FRANK W. MIGA, Primary Examiner

U.S. Cl. X.R.

65—11, 12, 43, 345, 374; 106—47